June 22, 1965  E. A. MOYANO  3,191,181
HOUR INDICATING DEVICE FOR A RECORDING INSTRUMENT
Filed Aug. 10, 1961  2 Sheets-Sheet 1
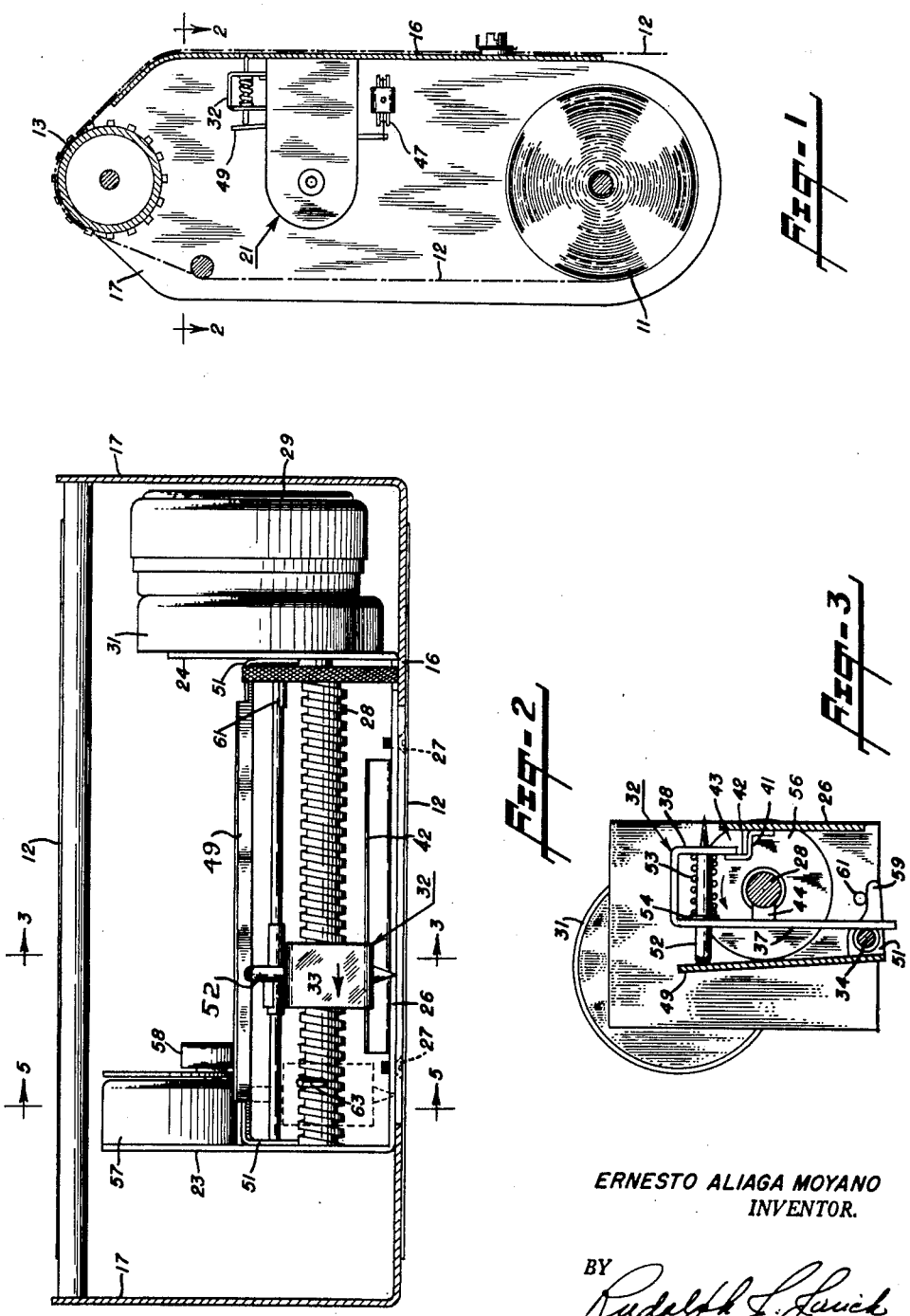
ERNESTO ALIAGA MOYANO
INVENTOR.
BY
Rudolph J. Lurich
ATTORNEY June 22, 1965   E. A. MOYANO   3,191,181
HOUR INDICATING DEVICE FOR A RECORDING INSTRUMENT
Filed Aug. 10, 1961   2 Sheets-Sheet 2
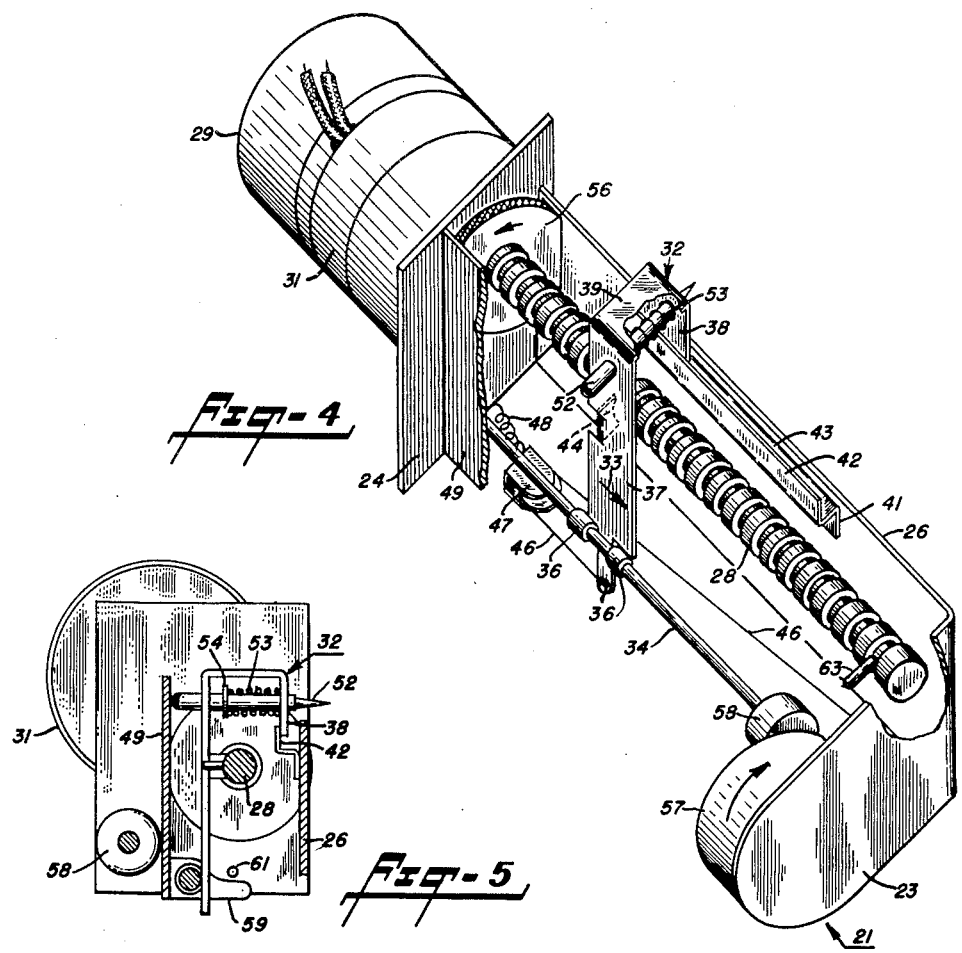
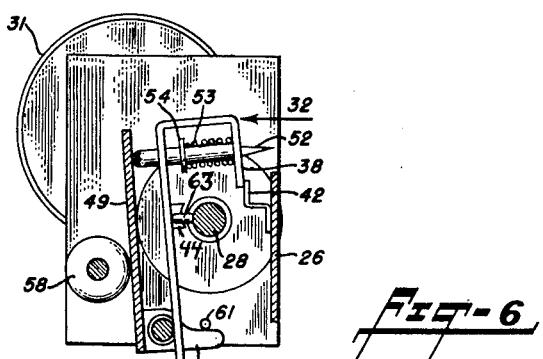
ERNESTO ALIAGA MOYANO
INVENTOR.

United States Patent Office 3,191,181
Patented June 22, 1965

3,191,181
HOUR INDICATING DEVICE FOR A
RECORDING INSTRUMENT
Ernesto Aliaga Moyano, New York, N.Y., assignor to
Thermo Electric Co., Saddle Brook, N.J., a corporation
of New Jersey
Filed Aug. 10, 1961, Ser. No. 130,562
4 Claims. (Cl. 346—93)

This invention relates to a recording instrument of the strip chart type and more particularly to a time indicating device for use thereon.

In recording instruments, a record of the value of a condition, or conditions, under measurement is made upon a movable strip chart. A pen, or stylus (or printing characters in the case of one type of multiple recorder), is utilized to make a record of the condition on the chart; the recording element being moved laterally across the chart to a position corresponding to the value of the condition.

Generally, the chart is continuously driven at a constant speed by means of a drive drum, or roller. Such chart may be graduated in units of time in the lengthwise direction, and in the transverse direction may be graduated in units of the condition being measured, such as temperature, pressure, weight, and the like. Often, however, a continuous record of the condition is not necessary. For example, it may be desired that the recorder operate only upon demand upon manual switching, or that the recorder operate only under alarm conditions when a condition exceeds a predetermined set point. At all other times, the recorder may be maintained on a stand-by condition wherein no record of the condition is being made. With such an arrangement, if the chart is stopped during such stand-by condition, and is driven only when recording, it will be apparent that lengthwise time graduations thereon provide no indication of the time of the recording.

An object of this invention is the provision of a time indicating device for use on a recording instrument, which provides a record of time on the chart independent of the chart position.

An object of this invention is the provision of a time indicating device for use on a strip chart recording instrument which includes means movably positioned laterly of the chart at a predetermined rate of movement, which means provides a time record on the chart upon actuation thereof.

An object of this invention is the provision of a time indicating device for a strip chart recorder comprising means puncturing the chart, the position of the resultant chart perforations laterally of the chart providing a record of time.

These and other objects and advantages will become apparent from the following description when taken with the accompanying drawings. It will be understood that the drawings are for purposes of illustration and are not to be constructed as defining the scope or limits of the invention, reference being had for the latter purpose to the appended claims.

In the drawings wherein like reference characters denote like parts in the several views:

FIGURE 1 is an end view of the novel time indicating device mounted on the chart of a strip chart recorder, parts of the recorder being shown in section for clarity;

FIGURE 2 is a cross-sectional view taken on line 2—2 of FIGURE 1 and showing my novel device as viewed from the top;

FIGURE 3 is a sectional view of the device taken on line 3—3 of FIGURE 2, only showing the device removed from the recorder;

FIGURE 4 is an isometric view of the novel device, with parts shown broken away for clarity;

FIGURE 5 is a cross sectional view taken on line 5—5 of FIGURE 2 only showing the device during time indicating operation; and FIGURE 6 is similar to FIGURE 5 only showing the carriage of the device in condition for return to a starting condition.

Reference is first made to FIGURES 1 and 2 of the drawings wherein there is shown a chart supply roll 11 from which a chart 12 is unwound. The chart 12 extends up over a drive roller, or drum 13 and then down past the front wall of a chart frame 16. The supply and drive rolls are rotatably mounted by any suitable means between end plates 17, 17 of the chart frame. The chart drive roll 13 may be periodically, intermittently, or continuously driven for advancement of the chart thereover by any suitable means, not shown, in the drawings. A suitable chart driven mechanism for intermittently or periodically driving the roll 13 is shown in my copending patent application Serial Number 108,818, filed May 9, 1961, now Patent No. 3,125,309, and entitled, Chart Drive Mechanism. The chart is graduated in the transverse direction in both units of the condition being measured, such as temperature, and in units of time.

The novel time indicating device of my invention, designated 21, includes a generally U-shaped supporting frame member comprising a pair of end walls 23 and 24 interconnected by a front wall 26, which is secured to the front wall of the chart frame 16 by means of screws 27 extending through holes formed in the frame and which threadedly engage tapped holes formed in the wall 26.

A lead screw 28 is rotatably supported between the end walls 23 and 24 of the frame member and is adapted to be driven continuously by a constant speed timing motor 29 connected thereto through a one way clutch 31. The lead screw 28, during rotation thereof, functions to drive a carriage 32 transversely of the chart in the direction of the arrow designated 33.

Referring, now, to FIGURES 3 and 4, the carriage 32 is slidably and rotatably mounted on a cylindrical rod 34 which extends between the end walls 23 and 24 of the frame member, the said carriage being provided with integral tube or bearing elements 36, 36 through which the rod 34 passes with a clearance fit. The carriage 32 is of an inverted U-shape having a pair of spaced and downwardly extending arms 37 and 38 interconnected by a top member 19. A holding bracket 41 is fixedly secured to the front wall 26 of the frame, and is provided with a rail section 42 parallel to and spaced from the wall 26 whereby an upwardly open groove 43 is formed between the rail section 42 and wall 26 within which groove the one arm 38 of the carriage 32 normally is positioned.

A forwardly extending arcuate lip 44 extends from the other arm 37 of the carriage and is adapted to ride in the threads of the lead screw 28; the illustrated lip (see FIGURE 4) being formed integrally with the arm 37, slit therefrom adjacent a vertical edge thereof and bent at right angles thereto toward said screw. As best viewed in FIGURE 3, the dimensioning and location of the cooperating lead screw 28, lip 44, carriage 32 and rail 42 are such that pivotable movement of the carriage 32 about the rod 34 is substantially prohibited so long as the forward arm 38 of the carriage is disposed within the rail groove 43. The carriage 32 is resiliently biased to the left, as viewed in FIGURE 4, by means of a cord 46, pulley 47, and spring 48 combination; the cord 46 being secured to the carriage 32 at one end and to the end wall 23 at the other end. The lip 44 is thereby resiliently biased into engagement with the thread of the lead screw.

An elongated plate 49 (shown broken away in FIG-

URE 4) is positioned behind the carriage 32 and pivotably mounted on the rod 34 by means of apertured ears 51, 51 formed on the plate 49 at the ends thereof, and through which the rod 34 extends, see particularly FIGURES 2 and 3. The pivotable plate 49 engages the rear end of a pin 52 which is axially slidably mounted in aligned apertures formed in the vertical arms 37 and 38 of the carriage. The front end of the pin 52 is sharply pointed for perforating the chart 12 upon forward axial movement of the pin, the chart frame being provided with a transverse slot for this purpose. A compression spring 53 extends between the forward arm 38 of the carriage and a flange or collar 54 on the pin, thereby resiliently biasing the pin in a retracted position, as illustrated in FIGURE 3. Upon clockwise rotation of the plate 49, as viewed in FIGURE 3, the pin 52 is moved forward and the sharp point thereof penetrates the chart leaving a perforation therein, the position of which laterally of the chart provides an indication of the time at which the perforation was made. The rate of rotation of the lead screw 28 may be such that the carriage 32 makes a single pass along the rail 42 in a 24 hour period. A desirably knurled collar 56, attached to the lead screw 28 and having a peripheral portion extending through suitable aligned slots formed in the wall of the frame member 26 and the chart frame, may be manually rotated for setting the carriage to the proper time; the clutch 31 between the screw 28 and motor 29 permitting such manual rotation during energization of the motor. Rotation of the plate 49 for movement of the pin 52 toward the chart is effected by means of a rotary solenoid 57 having an actuating sleeve 58 mounted eccentrically of the solenoid shaft. Upon energization of the solenoid, the sleeve 58 is rotated into engagement with the plate 49 to swing the plate and axially move the pin 52 to the position as shown in FIGURE 5. Upon deenergizing of the solenoid, the sleeve 58 is returned to a position away from the plate 49 and the spring 53 returns the pin and plate to the position illustrated in FIGURE 3. An arm 59, formed on one of the ears 51, engages a stop pin 61 to limit the counterclockwise rotation of the plate 49.

The timer motor 29 is continuously energized for continuous movement of the carriage 32 across the chart. As the carriage travels along the rod 34 in the direction of the arrow 33 (FIGURE 4) the load on the spring 48 increases. When the carriage 32 reaches the end position (such as illustrated in broken lines in FIGURE 2), the forward arm 38 of the carriage passes beyond the end of the rail 42 and is free for counterclockwise rotation about the rod 34, as viewed in FIGURE 6. In order to rotate the carriage counterclockwise, a pin 63 is provided, which pin extends radially from the lead screw 28 adjacent one end thereof (see FIGURE 4). This pin is adapted to engage the rear arm 37 of the carriage 32 for pivotal movement of the carriage, whereby the arm 38 of the carriage is rotated to a position at the rear of the rail 42 (as seen in FIGURE 6), and the lip 44 is disengaged from the lead screw. Upon such disengagement of the lip from the screw, the carriage is free to slide along the rear side of the rail 42 under the influence of the loaded spring 48.

It will be noted that the spring 53, which encircles the chart-puncturing pin 52, is compressed when the carriage 32 is pivoted backwardly, due to the engagement of the pin with the pivoted plate 49, see FIGURE 6. When the carriage is returned to its initial position, by action of the spring 48, FIGURE 4, the forward arm 38 of the carriage will pass just beyond the right hand end of the rail 42. At this point, the compressed spring 53 urges the carriage forwardly whereupon the arm 38 lies forward of the rail 42 and the lip 44, carried by the rear arm 37, will again engage the threads of the lead screw 28. Consequently, the carriage again starts its screw-driven travel along the rod 34.

Since the time indicating arrangement is independent of the chart drive mechanism, it will be apparent that any suitable chart drive mechanism may be employed wherein the chart is continuously, intermittently, or periodically moved at any desired rate.

Having now described my invention in detail, in accordance with the requirements of the patent statutes, various changes and modifications will suggest themselves to those skilled in this art. It is intended that such changes and modifications shall fall within the spirit and scope of the invention as recited in the following claims.

I claim:

1. A time indicating device for use on a recording instrument employing a chart, said device comprising a rotatable lead screw, a rod parallel to the lead screw and spaced therefrom, a carriage slidably and rotatably mounted on the rod, a lip extending from the carriage and adapted for engagement with the lead screw thread for drive movement of the carriage along the rod upon rotation of the lead screw, means continuously rotating the lead screw, means including a pin carried by the lead screw and engaging the carriage at one end of travel thereof along the rod, periodically disengaging the lip on the carriage from the lead screw and resilient means connected to the carriage and biasing it to the opposite end of travel along the rod, returning the carriage to a predetermined position along the screw, and time recording means carried by the carriage and normally spaced from the chart.

2. A time indicating device for use on a recording instrument of the type having a movable strip chart graduated transversely in units of time, said device comprising a rotatable lead screw, a rod parallel to the lead screw and spaced therefrom, a carriage slidably and rotatbly mounted on the rod, a lip extending from the carriage and adapted for engagement with the lead screw thread for drive movement of the carriage along the rod upon rotation of the lead screw, means continuously rotating the lead screw, means including a pin carried by the lead screw and engaging the carriage at one end of travel thereof along the rod, periodically disengaging the lip on the carriage from the lead screw and including a spring which upon such disengaging returns the carriage to a predetermined position along the screw, time recording means carried by the carriage movable across the chart at constant speed and normally spaced from said chart, and means independent of the chart position for moving the time recording means into engagement with said chart so that the position of the means laterally of the chart at the time of such engagement provides an indication of the engagement time to provide a time record on the chart.

3. The invention as recited in claim 2 wherein the time recording means includes a resiliently biased pointed pin which penetrates the chart upon movement thereof into engagement with the chart, the said means moving the time recording means including an elongated plate positioned behind the said pin and pivotably mounted on the said rod, and a solenoid adapted to engage the plate and rotate the same into engagement with the pin to move it into the chart upon energization of said solenoid.

4. A time indicating device for use on a recording instrument of the type having a movable strip chart graduated transversely in units of time, said device comprising a rotatable lead screw, a rod parallel to the lead screw and spaced therefrom, a carriage slidably and rotatably mounted on the rod, a lip extending from the carriage and adapted for engagement with the lead screw thread for drive movement of the carriage along the rod upon rotation of the lead screw, means continuously rotating the lead screw, means including a pin carried by the lead screw and engaging the carriage at one end of travel thereof along the rod, periodically disengaging the lip on the carriage from the lead screw and resilient means connected to the carriage and biasing it to the opposite end of travel along the rod, returning the carriage to a predetermined position along the screw, time recording means carried by the carriage and normally spaced from the chart, said time recording means including a resiliently biased pointed pin which penetrates the chart upon movement thereof into engagement with the chart, means including an elongated plate positioned behind the said pin and pivotably mounted on the said rod and a solenoid adapted to engage the plate and rotate the same into engagement with the pin to move it into the chart upon energization of said solenoid, so that the position of the means laterally of the chart at the time of such engagement provides an indication of the time of such engagement for providing a time record on the chart, and wherein the means resiliently biasing the pointed pin urges the lip on the carriage back into the threads of the lead screw at the opposite end thereof.

References Cited by the Examiner

UNITED STATES PATENTS

| | | | |
|---|---|---|---|
| 138,437 | 4/73 | Richardson | 346—71 X |
| 258,672 | 5/82 | Pouget | 346—80 X |
| 448,560 | 3/91 | Tyng | 346—62 |
| 1,723,228 | 8/29 | Burnham | 346—80 |
| 1,754,503 | 4/30 | Dwelle | 346—139 X |
| 2,155,646 | 4/39 | Fetter et al. | 346—80 X |
| 2,340,279 | 1/44 | Wallace | 346—141 X |
| 2,850,349 | 9/58 | Mandel | 346—80 |

FOREIGN PATENTS 406,058   2/34   Great Britain.

LEO SMILOW, *Primary Examiner.*

JULIA E. COINER, LEYLAND M. MARTIN,
*Examiners.*